United States Patent
Chau

(10) Patent No.: US 7,090,414 B2
(45) Date of Patent: Aug. 15, 2006

(54) AUTOMATIC APPARATUS FOR CLEAVING OPTICAL FIBER WAVEGUIDES

(75) Inventor: Holam Chau, Lafayette Hill, PA (US)

(73) Assignee: Aurora Instruments, Inc., Ambler, PA (US)

( * ) Notice: Subject to any disclaimer, the term of this patent is extended or adjusted under 35 U.S.C. 154(b) by 147 days.

(21) Appl. No.: 10/806,537

(22) Filed: Mar. 23, 2004

(65) Prior Publication Data

US 2004/0190850 A1    Sep. 30, 2004

(51) Int. Cl.
G02B 6/255 (2006.01)
G02B 6/26 (2006.01)

(52) U.S. Cl. .......................................... 385/97; 385/52

(58) Field of Classification Search ................ 385/97, 385/52
See application file for complete search history.

(56) References Cited

U.S. PATENT DOCUMENTS

| | | | |
|---|---|---|---|
| 4,274,707 A | 6/1981 | Pacey et al. | 350/96.2 |
| 4,548,630 A | 10/1985 | Biedka | 65/2 |
| 4,696,535 A | 9/1987 | Saha | 350/96.15 |
| 4,735,481 A | 4/1988 | Lukas et al. | 350/96.2 |
| 4,765,704 A | 8/1988 | Pers | 350/96.15 |
| 4,790,617 A | 12/1988 | Campbell et al. | 350/96.15 |
| 4,824,199 A | 4/1989 | Uken | 350/96.15 |
| 4,832,438 A | 5/1989 | Engel et al. | 350/96.2 |
| 4,911,524 A | 3/1990 | Itoh et al. | 350/96.21 |
| 4,950,046 A | 8/1990 | Hughes et al. | 350/96.18 |
| 4,978,201 A | 12/1990 | Yamada et al. | 350/320 |
| 5,002,357 A | 3/1991 | Newell | 350/96.2 |

(Continued)

Primary Examiner—Kaveh Kianni
(74) Attorney, Agent, or Firm—Ernest D. Buff & Associates, LLC; Ernest D. Buff; Gordon E. Fish

(57) ABSTRACT

An apparatus and method for cleaving an optical fiber waveguide comprises a support base, a fixed fiber support including a fixed fiber base and a self-aligning fiber holder, a fiber pull tension assembly including a tension assembly base and a rotatable pull clamp, a tension spring, and a scribing knife assembly. The self-aligning fiber holder and the pull clamp support the fiber in an adjustable tension applied by the tension spring. The knife assembly comprises a blade carriage reciprocally driven on a linear slide by a motor drive assembly through a crank and a crank actuator. On the blade carriage is mounted a scribing blade borne on a blade arm that is upwardly biased. A guide pin on the blade arm engages a generally parallelogram-shaped guide track in the fixed fiber base. The guide track has an upper track and a lower track. During forward motion of the blade carriage, the guide pin travels in the lower track, thereby depressing the blade arm. Throughout the rearward motion of the carriage, the blade arm remains in an upper position, wherein the scribing blade engages the fiber with a scribing force and scribes it. Preferably the scribing force is adjustable. The carriage further comprises a fiber tension profile bar which engages a roller on the pull clamp to limit the tension in the fiber that results from rotation of the pull clamp caused by the tension spring. Preferably the bar has a plurality of profile steps, whereby the tension is applied to the fiber at a plurality of levels during the rearward travel of the blade carriage. The levels preferably comprise a scribing level applied during the scribing and a fracture level applied subsequently. During scribing, the scribing level is sufficient to hold the fiber taut without substantially curling or rotating it. The fracture level is sufficiently higher than the scribing level to cause fracture of the fiber after scribing.

12 Claims, 6 Drawing Sheets

U.S. PATENT DOCUMENTS

| | | | |
|---|---|---|---|
| 5,011,259 A | 4/1991 | Lieber et al. | 350/96.21 |
| 5,150,502 A * | 9/1992 | Roberson | 19/105 |
| 5,195,157 A | 3/1993 | Penfold | 385/96 |
| 5,249,246 A | 9/1993 | Szanto | 385/96 |
| 5,249,247 A | 9/1993 | Whitesmith | 385/96 |
| 5,257,337 A | 10/1993 | Grigsby et al. | 385/99 |
| 5,340,371 A | 8/1994 | Dyott | 65/501 |
| 5,417,733 A | 5/1995 | Wesson | 65/378 |
| 5,481,640 A | 1/1996 | Harman et al. | 385/147 |
| 5,533,160 A | 7/1996 | Watanabe et al. | 385/96 |
| 5,561,728 A | 10/1996 | Kobayashi et al. | 385/97 |
| 5,570,446 A | 10/1996 | Zheng et al. | 385/98 |
| 5,677,973 A | 10/1997 | Yuhara et al. | 385/90 |
| 5,758,000 A | 5/1998 | Zheng | 385/97 |
| 5,815,611 A | 9/1998 | Dhadwal | 385/12 |
| 6,034,718 A | 3/2000 | Hattori | 348/61 |
| 6,088,503 A | 7/2000 | Chandler et al. | 385/135 |
| 6,190,057 B1 | 2/2001 | Osaka et al. | 385/96 |
| 6,203,214 B1 | 3/2001 | Wesson | 385/97 |
| 6,206,583 B1 | 3/2001 | Hishikawa et al. | 385/96 |
| 6,246,819 B1 | 6/2001 | Windebank | 385/48 |
| 6,287,020 B1 | 9/2001 | Osaka et al. | 385/96 |
| 6,294,760 B1 | 9/2001 | Inoue et al. | 219/383 |
| 6,324,319 B1 | 11/2001 | Tselikov et al. | 385/28 |
| 6,341,242 B1 | 1/2002 | Mahmood et al. | 700/117 |
| 6,816,662 B1 * | 11/2004 | Doss et al. | 385/134 |
| 2003/0007774 A1 * | 1/2003 | Christopher et al. | 385/147 |
| 2005/0058422 A1 * | 3/2005 | Doss et al. | 385/137 |
| 2005/0217100 A1 * | 10/2005 | Schwar | 29/432 |

* cited by examiner

AUTOMATIC APPARATUS FOR CLEAVING OPTICAL FIBER WAVEGUIDES

BACKGROUND OF THE INVENTION

1. Field of the Invention

This invention relates to an apparatus for cleaving optical fiber waveguides; and more particularly, to an automatic apparatus for cleaving an optical fiber waveguide held in tension to produce a planar end surface perpendicular to the fiber axis and suitable for fusion splicing.

2. Description of the Prior Art

Transmission of data by optical fiber waveguides, also called fiber optics or optical fibers, has become ubiquitous in the telecommunications and computer industries. Digital information in an electronic system is converted into a series of pulses of light generated by lasers or light emitting diodes (LED's), which are injected into long fibers of glass or polymeric materials. The fibers are capable of propagating the light with extremely low losses and acceptably low dispersion, whereby information embodied in the modulation pattern may be conveyed. The light that emerges from the other end of the fiber can be detected and reconverted into electronic signals that faithfully reproduce the original signal.

Fiber optic communication has a number of advantages over traditional transmission means such as hard-wired coaxial and twisted pair cable and lower frequency electromagnetic broadcasting such as radio and microwave. Foremost is the much larger bandwidth available. In addition, existing infrastructure such as cable ducts, utility poles, and the like presently used by telecommunications companies can be upgraded with relatively little disruption and moderate cost by substituting optical fiber cable for existing copper wire. Thus, dramatic increases in bandwidth needed to accommodate the needs of an information-based, Internet-driven society and commerce can be obtained with comparatively little disruption.

The bandwidth of a given optical communications system is further increased by the use of polarization-maintaining (PM), single mode optical fiber. Such PM fiber is characterized by some form of azimuthal asymmetry that results in very different propagation constant modes of two orthogonal polarizations. Cross-coupling of the modes is very low, typically at a level of −20 to −30 dB.

Implementation of fiber optic systems requires both the equipment for actual transmission and processing of the data, and the equipment needed to install and maintain the fiber optic system and its infrastructure. The transmission and processing equipment, such as the fiber itself and the corresponding components needed to generate, detect, and process optically-borne information, have been developed to an ever increasing level of sophistication. While certain systems for joining and splicing fiber optic cables have been developed, there remains a need in the art for improved equipment and methods for splicing that are reliable, economical, and which result in minimal loss of signal integrity and strength, especially for the polarization-maintaining fibers. Such systems, equipment, and methods are essential if the full inherent advantages of optical transmission are to be more widely implemented.

Together, these considerations call for splicing systems that are compact, portable, and able to be operated rapidly and reliably under adverse working conditions and with minimal slack cable. Moreover, it is desired that such a splicing system be capable of joining two fibers in a way that (i) causes minimal disruption discontinuity in the optical transmission, (ii) does not adversely increase the diameter and volume of the cable, and (iii) has a durability as close as possible to that of an original fiber. Systems are also desired that are simple and reliable enough to be used by technicians who lack extensive training. There remains an urgent need for optical splicing equipment satisfying these requirements.

Optical fiber waveguides in common use share a number of structural features. The waveguide almost invariably comprises a thin, elongated fiber core responsible for conducting the light and at least one additional layer. Most often the fiber core is highly pure glass surrounded by a first and intimately-bonded layer termed a cladding and an outer layer called a buffer. The cladding, usually also glass, has an index of refraction lower than that of the core to insure that light is constrained for transmission within the core by total internal reflection. Typically, the buffer is composed of plastic or polymer and serves to protect the inner layers mechanically and to prevent attack by moisture or other substances present in the fiber's environment. Commonly a plurality of individual fibers (in some cases as many as a thousand) constructed in this fashion is bundled together and enclosed in a protective jacket to form a cable.

Commonly used fibers may further be classified as multimode or single mode. Multimode fibers typically comprise cores having diameters of 50–62.5 μm but in some cases up to 100 μm. Single mode fibers generally have a much smaller core that may be 9 μm or less in diameter. The glass-cladding diameter is most commonly 125 μm but sometimes is 140 μm (with a 100 μm core). The exterior diameter is largely a function of the buffer coating, with 250 μm most common, although some fiber coatings may be as much as 900 μm in diameter.

Two general approaches for splicing optical fibers are in widespread use, viz. mechanical and fusion splicing. Mechanical splicing is accomplished by securing the ends of two fibers in intimate proximity with an aligning and holding structure. Often the fibers are inserted into the opposing ends of a precision ferrule, capillary tube, or comparable alignment structure. The fibers are then secured mechanically by crimping, clamping, or similar fastening. An adhesive is also commonly used. In some cases a transparent material such as a gel having an index of refraction similar to that of the fiber cores is used to bridge the gap between the fibers to minimize reflection losses associated with the splice. Mechanical splicing is conceptually simple, and minimal apparatus is required to effect splicing. However, even in the best case, a mechanical splice has relatively high and undesirable insertion loss, typically 0.20 dB. In addition, mechanical splices are generally vulnerable to degradation of the optical quality of the splice over time, especially under adverse environmental conditions such as varying temperatures and high humidity. Mechanical splices are generally regarded as being temporarily expedients at best and are not useful for high bandwidth systems or permanent joints.

Fusion splicing entails the welding of the two fiber ends to each other. That is, the ends are softened and brought into intimate contact. The softening is typically induced by a small electric arc struck between miniature pointed electrodes mounted in opposition and substantially perpendicular to the common axis of the fibers. Upon cooling, a strong, low-loss joint is formed. When properly carried out, fusion splices exhibit very low losses along with high stability and durability rivaling those of the uncut fiber.

Careful preparation of the ends of the fibers being joined is essential for forming low loss splices in both ordinary and polarization maintaining optical fibers. In particular, each fiber end ideally should be a planar surface perpendicular to the fiber axis. However it is frequently found that existing methods produce surfaces having a variety of defects compromising this ideal surface. The defects include non-perpendicular surfaces, non-planar depressions or protruding asperities, and chips off the periphery of the terminal end. Each of these defects adversely impacts the quality of a fusion splice. It is also known that the brittle fracture of the glass material of the fiber requires careful control of the mechanism used to induce the fracture.

A number of devices, both manual and automatic, have been proposed for carrying out the cleaving operation. In generally, they rely on using a knife blade or similar hard surfaced tool to induce a surface mechanical defect on the circumference of the fiber and imparting a mechanical force to cause a crack to propagate from the induced defect to sever an expendable portion and leave a mating face.

However, existing devices generally lack the degree of control and automation needed for reliably producing a planar, perpendicular mating face for proper fusion splicing. They are relatively complex in design, construction, and operation. The consistency of results is highly dependent on the skill and attention of the operator. As a result, there is a significant need for a system wherein the cleaving process is carried out consistently to eliminate the unpredictable effects of operator action.

SUMMARY OF THE INVENTION

The present invention provides an apparatus and method for cleaving an optical fiber waveguide to produce at the end thereof a planar surface suitable for joining to another optical fiber waveguide, preferably by fusion splicing. Advantageously the present apparatus operates reliably and with minimal operator skill required to form an end that is (i) substantially perpendicular to the axis of the fiber; and (ii) substantially free from cracks, depressions, asperities, peripheral chips, or other similar surface defects that inhibit formation of a high quality joint either by fusion or by mechanical splicing.

In one embodiment, the apparatus comprises a support base, a fixed fiber support including a fixed fiber base and a self-aligning fiber holder, a fiber pull tension assembly including a tension assembly base and a rotatable pull clamp, a tension spring, and a scribing knife assembly. The self-aligning fiber holder and the pull clamp support the fiber in an adjustable tension applied by the tension spring. The knife assembly comprises a blade carriage reciprocally driven on a linear slide by a motor drive assembly through a crank and a crank actuator. On the blade carriage is mounted a scribing blade borne on a blade arm that is upwardly biased. A guide pin on the blade arm engages a generally parallelogram-shaped guide track in the fixed fiber base, the guide track having an upper track and a lower track. The guide pin travels in the lower track during the forward motion of the blade carriage, thereby depressing the blade arm. During the rearward motion of the carriage, the blade arm is in an upper position wherein the scribing blade engages the fiber with a scribing force and scribes it. Preferably the scribing force is adjustable. The carriage further comprises a fiber tension profile bar which engages a roller on the pull clamp to limit the tension in the fiber that results from rotation of the pull clamp caused by the tension spring. Preferably the bar has a plurality of profile steps, whereby the tension is applied to the fiber at a plurality of levels during the rearward travel of the blade carriage. The levels preferably comprise a scribing level applied during the scribing and a fracture level applied subsequently, the scribing level being sufficient to hold the fiber taut during said scribing without substantially curling or rotating it and the fracture level being sufficiently higher than the scribing level to cause fracture of the fiber thereafter.

Advantageously, cleaving apparatus constructed in accordance with the present invention permits adjustment and reproducible control of a number of important process parameters, including the speed of fiber scribing, the force of engagement of the scribing blade onto the fiber, the tension levels applied to the fiber during the scribing phase and during the fracture phase, and the location of the fracture plane relative to the fiber clamping system and the resulting length of fiber projection. As a result, variation in one or more of these parameters, both from part to part and operator to operator, seen in prior art methods are substantially reduced or eliminated, resulting in cleaving that is highly reproducible. In addition, the present apparatus advantageously provides control of the scribing process based on the force applied by the scribing blade, as opposed to its position.

The combination of these factors results in more consistent and efficient preparation of cleaved fibers for splicing which have planar, non-defected mating surfaces. In turn, splices made with well-cleaved fibers prepared in accordance with the present invention more reliably exhibit high quality and lower losses. Moreover, enhanced reproducibility allows the system to be operated satisfactorily by operators who do not need the higher level of skill required with previous systems.

BRIEF DESCRIPTION OF THE DRAWINGS

The invention will be more fully understood and further advantages will become apparent when reference is had to the following detailed description of the various embodiments of the invention and the accompanying drawings, wherein like reference numerals denote similar elements throughout the several views, and in which.

DETAILED DESCRIPTION OF THE PREFERRED EMBODIMENTS

The present invention is directed to an apparatus and system for cleaving an optical fiber in preparation for splicing by mechanical or fusion techniques.

Figure 1:
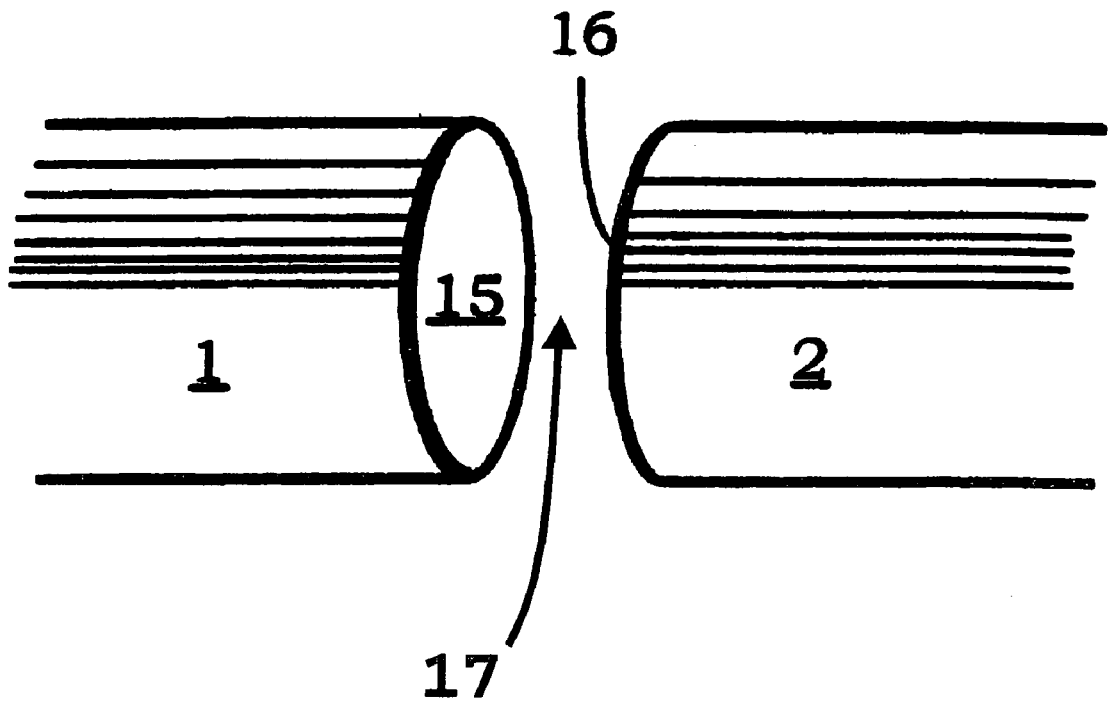
FIG. 1 is a perspective view of two optical fibers cleaved in accordance with the invention and disposed for splicing.

Referring to FIG. 1 of the drawings, there are shown two optical fibers 1, 2 that have been prepared for splicing by cleaving them using the apparatus of the invention. The fibers are disposed in coaxial position for splicing, e.g. by fusion or mechanical means. The cleaved ends have planar surfaces 15, 16 that are perpendicular to the respective fiber axes and free from cracks, depressions, asperities, peripheral chips, or other similar surface defects that inhibit formation of a high quality joint either by fusion or by mechanical splicing.

Figure 2:
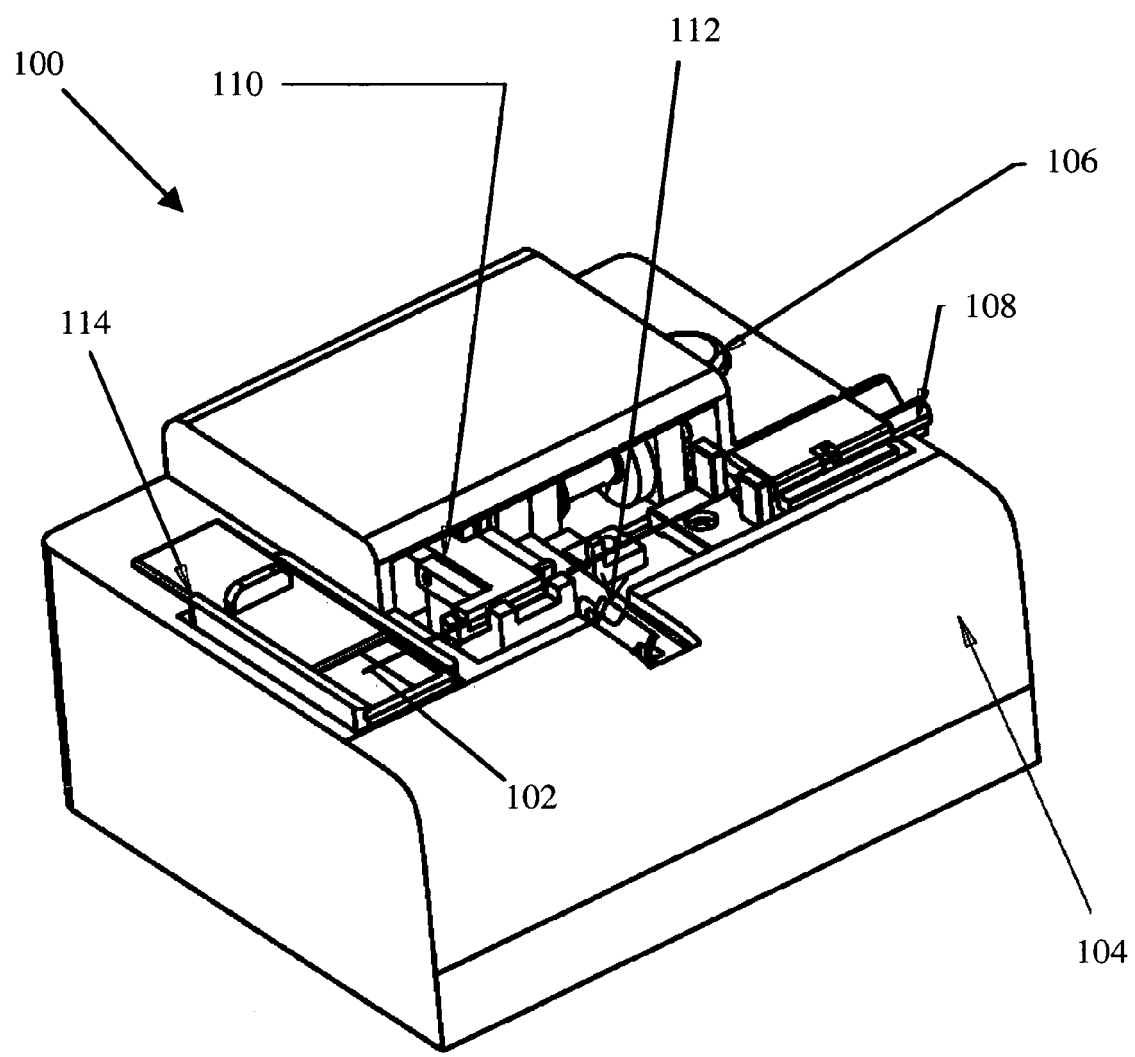
FIG. 2 is a perspective view depicting schematically a fiber cleaving system of the invention.

An embodiment of automatic cleaving apparatus 100 of the invention is depicted generally in FIG. 2. Fiber 102 is supported at its supply end by self-aligning fiber holder 108 and at its free end by pivot fiber clamp assembly 110. Scribing knife assembly 112 operates to scribe fiber 102 at a scribing point between holder 108 and fiber clamp assembly 110. Thereafter the fiber 102 is fractured at the scribing point to form a planar end face on the portion supported by holder 108. The portion held by clamp assembly 110 is discarded. Preferably tray 114 is provided as a receptacle for discarded ends. Apparatus 100 is preferably housed in a plastic or metal case 104.

Preferably self-aligning holder 108 is removable from apparatus 100. Fiducial alignment pins (not shown) provided in the bottom of holder 108 mates with complementary holes in the support base 143 of apparatus 100 to assure reproducible positioning of holder 108. Of course, the placement of pins and holes may be interchanged, and other interlocking geometric alignment features may also be used to accomplish the alignment. Advantageously, a fiber held in a removable holder may be cleaved in accordance with the present invention, and then be transferred, while still positioned in the holder, to a fiber splicing apparatus appointed with a substantially identical alignment structure. This interchangeable mounting allows the length of fiber to be established precisely and reproducibly, facilitating alignment that must be carried out in a splicing system.

Figure 3A:
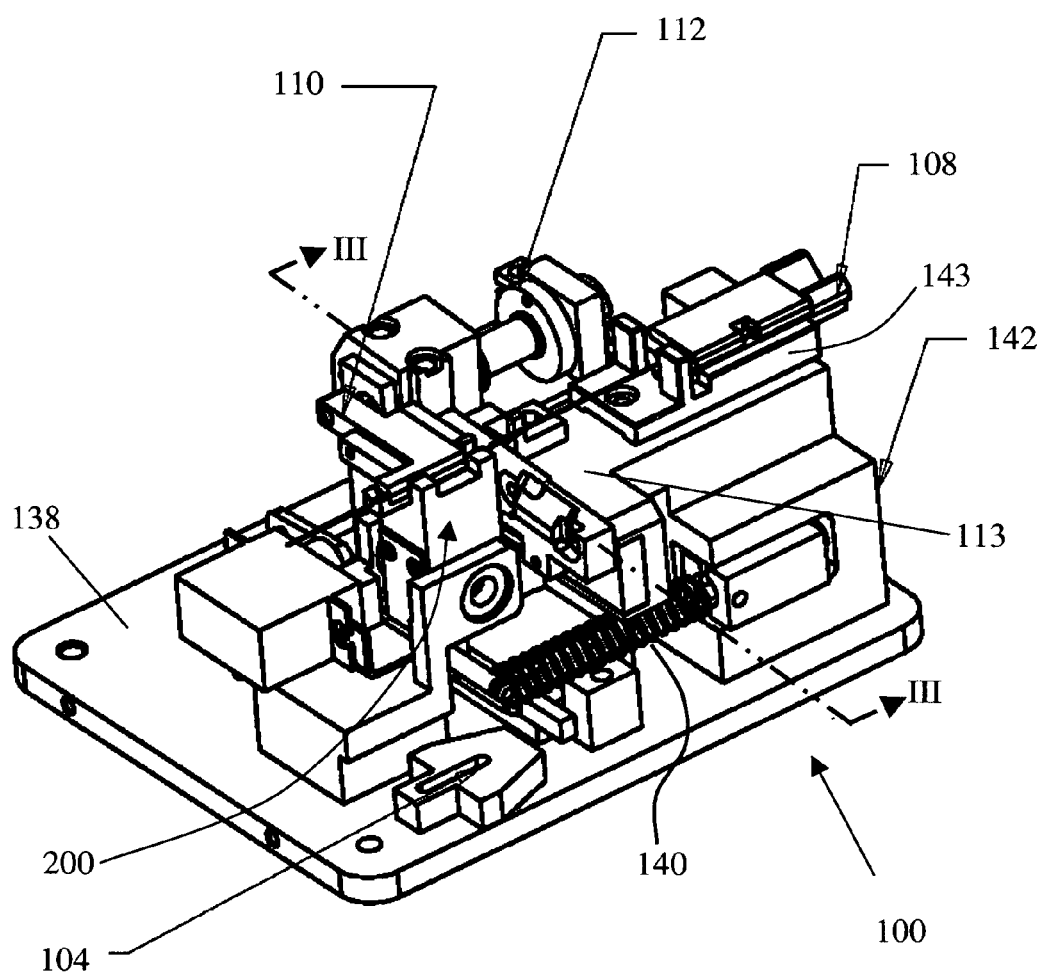
FIG. 3A is a perspective view schematically depicting the fiber cleaving system of FIG. 2 in greater detail.
Figure 3B:
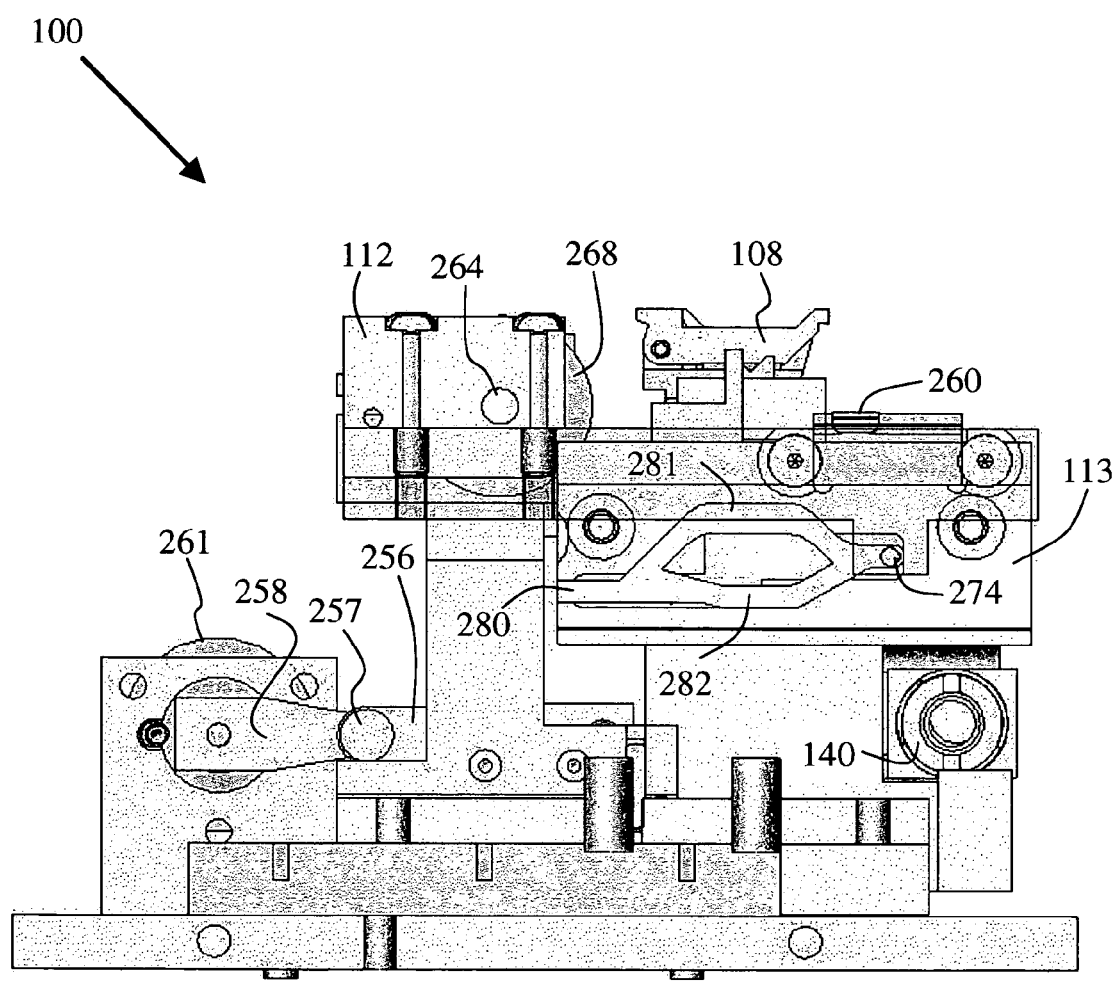
FIG. 3B is a cross-sectional view of the fiber cleaving system of FIG. 3A taken at level III—III.

A more detailed view of the embodiment of FIG. 2 is shown in FIGS. 3A–3B. Various subassemblies of the apparatus 100 are attached to base 138, including fiber pull tension assembly 200. As further depicted by FIG. 5, fiber clamp 202 pivotally opens about hinge pin 210 to accommodate and secure fiber 102. Clamp 202 is opened by action of servo motor 204. Tension spring 140 urges pull clamp 212 to rotate about tension pivot 206 in the direction "T". A resultant torque applies a tension to fiber 102 that is tangentially directed. Roller 208 engages fiber tension profile bar 250 seen in FIG. 4 to limit the extent of rotation of clamp 212 and thus, the magnitude of the tension in fiber 102. The tension is further controlled by adjustment 142, which varies the extension of spring 140.

Figure 4:
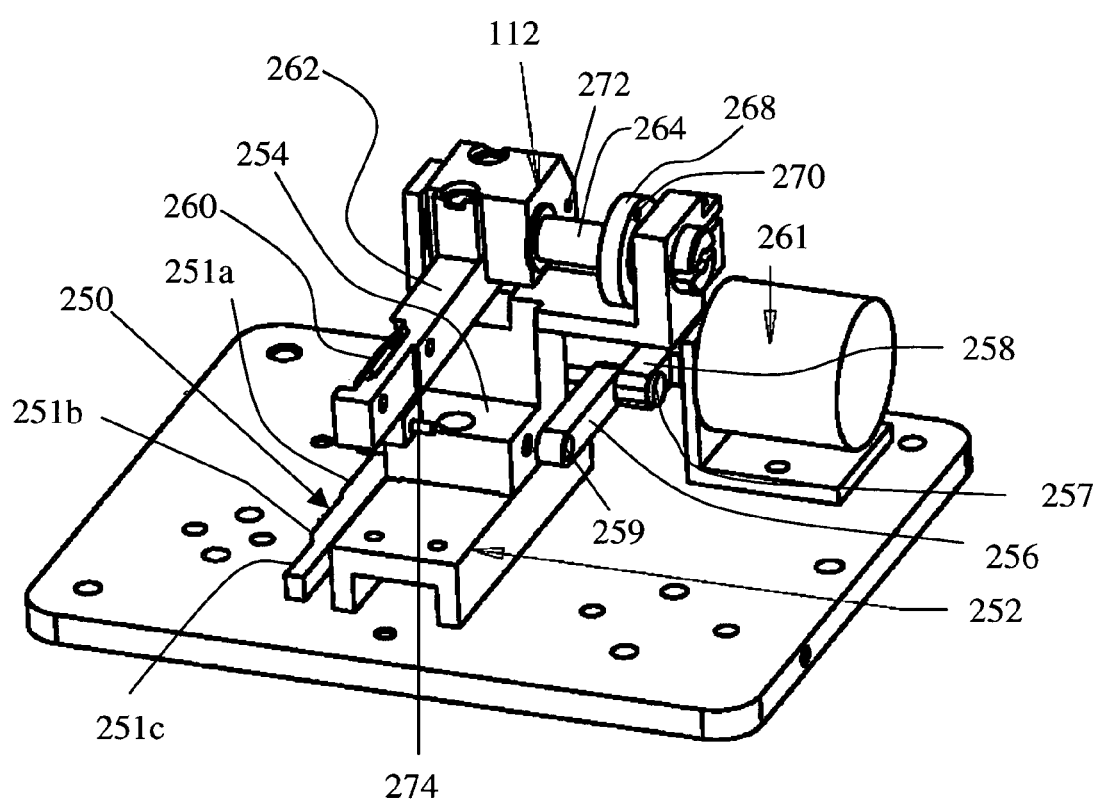
FIG. 4 is a perspective view depicting schematically a scribing knife assembly used in the fiber cleaving system shown in FIGS. 2–3.

FIG. 4 further depicts scribing knife assembly 112 including blade arm 262 and blade 260 mounted thereon. Blade arm 262 is rotatably mounted on shaft 264. A coil blade force spring (not shown) operating in torsion, with its ends disposed in holes 272 and 270 upwardly biases arm 262. The amount of bias is advantageously adjustable by rotating blade force adjustment drum 268, which is locked to shaft 264 by a setscrew or other comparable locking means (not shown). The amount of force of engagement of blade 260 is thereby adjustable to a preselected, controlled value. Preferably, the force ranges from about 1 to 5 grams. The lateral position of blade arm 262 on shaft 264 is preferably adjustable, thereby allowing adjustment of the amount of fiber projecting from fiber holder 108 after cleaving.

Knife assembly 112 is supported on blade carriage 254 for reciprocating motion along linear slide 252. Motor drive assembly 261 operates to rotate crank 258 pivotally attached to carriage actuator 256 at pivot 257. Actuator 256, in turn, is pivotally attached at carriage pivot 259.

In operation, each cleaving cycle comprises one rotation of crank 258 and one reciprocating motion of carriage 254 and knife assembly 112. Pin 274 rides in a generally parallelogram-shaped, vertically oriented guide track 280 in a side of support 113. The track includes guide wires that direct pin 274 non-reversibly to an upper slide track 281 during the rearward retraction of carriage 254 toward motor 261 and to a lower slide track 282 during the forward stroke of carriage 254. As a result, upwardly biased blade 260 engages fiber 102 during the rearward stroke, whereby the fiber is scribed to form a crack-initiating defect, while blade 260 is depressed to withdraw it from engagement with fiber 102 during the forward stroke.

At the completion of the forward stroke, the position of carriage 254 is sensed by sensor 144 and motor drive 261 is stopped in response. The apparatus is thereby armed for its next use, with blade 260 in its forward position, downwardly removed from contact with fiber 102. Sensor 144 may be any suitable mechanical switch or a non-contact magnetic or optical position sensor that may operate with suitable switching means to stop the apparatus cycle.

The reciprocating action of carriage 254 further acts to cause variation in the tension applied to fiber 102 that results both in reliable scribing of the fiber and in reproducible fracture to form a planar and mating surface. Plural levels of tension are provided by steps in fiber tension profile bar 250, e.g. steps 251a, 251b, and 251c depicted in FIG. 4. As previously noted, overall tension is applied to fiber 102 by fiber tension pull assembly 200 biased by spring 140. During the scribing, roller 208 successively engages steps 251a–251c attached to carriage 254. The steps variably limit the allowable rotation of assembly 200, the minimum rotation in the counter clockwise direction T occurring during engagement with step 251a. As carriage 254 moves rearward, the rotation increases with the engagement with step 251b and still further with step 251c. Increased counterclockwise rotation increases the tension applied to fiber 102. The scribing takes place during the application of the intermediate tension corresponding to step 251b. The level of tension is preselected to make the fiber adequately taut to support the fiber and not permit it to curl or rotate in resistance to the frictional force attendant to the scribing. As a result, the location and intensity of the scribing are reproducible. Engagement with step 251c increases the tension to a preselected level sufficient to cause the crack initiated by the scribing to propagate across the fiber, thereby producing a clean, planar fracture surface perpendicular to the fiber axis.

Cleaving apparatus constructed in accordance with the present invention affords a number of advantages over prior art systems. Important process parameters, including the speed of fiber scribing, the force of engagement of the scribing blade onto the fiber, the tension levels applied to the fiber during the scribing phase and during the fracture phase, and the location of the fracture plane relative to the fiber clamping system and the resulting length of fiber projection, are all adjustable but are highly reproducible from cleave operation to operation. Other systems, especially manual systems, inevitably exhibit variation in one or more of these parameters, both from part to part and operator to operator. As a result, splices made with fibers cleaved in accordance with the present invention more reliably exhibit high quality and lower losses. Moreover, the reproducibility allows the system to be operated satisfactorily by operators who do not need the level of skill required with previous systems.

In addition, the scribing operation of the present system is advantageously force-controlled and not position-controlled. Previous systems have frequently relied on setting the displacement of the crimping blade from the presumed axis of a mounted fiber to control scribing. By way of contrast, the present blade is force controlled by the torsion imparted to the blade arm by the blade force spring. Slight variations in fiber position thus do not result in marked variation in the depth of the scribed defect induced on the fiber surface. The reproducibility, in turn, results in greater consistency in the planar fracture surface.

Together, these advantages allow the present apparatus to be utilized more economically and accurately on a cleave-to-cleave basis, with higher throughput of acceptable cleaves.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. An apparatus for cleaving an optical fiber waveguide, comprising:
   a) a support base;
   b) a fixed fiber support comprising a fixed fiber base including a guide track having an upper track and a lower track attached to said support base and a self aligning fiber holder adapted to hold said fiber at a supply end of said fiber, said holder being removably attached to said fixed fiber base;
   c) a fiber pull tension assembly having a tension assembly base attached to said support base and a pull clamp rotatably attached to said tension assembly base, said pull clamp having a roller and being openable to receive said fiber and hold it at a free end of said fiber,
   d) a tension spring adjustably attached to said pull clamp and said fixed fiber base, said spring rotationally biasing said pull clamp to place said fiber in tension between said pull clamp and said self aligning fiber holder; and
   e) a scribing knife assembly comprising:
      (i) a motor drive assembly including a rotating crank;
      (ii) a linear slide and a blade carriage slidably mounted thereon for reciprocal motion traversing a forward direction and a rearward direction of travel, said blade carriage being driven by an actuator pivotally attached to said carriage and said crank, and said blade carriage comprising a fiber tension profile bar in engagement with said roller to control said tension;
      (iii) an upwardly biased blade arm attached to said carriage and having a scribing blade thereon; and
      (iv) a guide pin adapted to engage said guide track, said guide pin following said upper track during said rearward travel and said lower track during said forward travel, whereby said blade arm is biased to engage said fiber with said scribing blade with a scribing force and scribe said fiber during said rearward travel, said scribing force ranging from about 1 to 5 grams, and said blade arm is depressed to withdraw said scribing blade from engagement with said fiber during said forward travel.

2. An apparatus as recited by claim 1, further comprising a servo motor adapted to open and close said pull clamp to receive and secure said free end of said fiber.

3. An apparatus as recited by claim 1, wherein said scribing force of said blade is adjustable.

4. An apparatus for cleaving an optical fiber waveguide, comprising:
   a) a support base;
   b) a fixed fiber support comprising a fixed fiber base including a guide track having an upper track and a lower track attached to said support base and a self aligning fiber holder adapted to hold said fiber at a supply end of said fiber, said holder being removably attached to said fixed fiber base;
   c) a fiber pull tension assembly having a tension assembly base attached to said support base and a pull clamp rotatably attached to said tension assembly base, said pull clamp having a roller and being openable to receive said fiber and hold it at a free end of said fiber,
   d) a tension spring adjustably attached to said pull clamp and said fixed fiber base, said spring rotationally biasing said pull clamp to place said fiber in tension between said pull clamp and said self aligning fiber holder; and
   e) a scribing knife assembly comprising:
      (i) a motor drive assembly including a rotating crank;
      (ii) a linear slide and a blade carriage slidably mounted thereon for reciprocal motion traversing a forward direction and a rearward direction of travel, said blade carriage being driven by an actuator pivotally attached to said carriage and said crank, and said blade carriage comprising a fiber tension profile bar in engagement with said roller to control said tension;
      (iii) an upwardly biased blade arm attached to said carriage and having a scribing blade thereon; and
      (iv) a guide pin adapted to engage said guide track, said guide pin following said upper track during said rearward travel and said lower track during said forward travel, whereby said blade arm is biased to engage said fiber with said scribing blade with a scribing force and scribe said fiber during said rearward travel, said scribing force ranging from about 1 to 5 grams, and said blade arm is depressed to withdraw said scribing blade from engagement with said fiber during said forward travel; and
   wherein said fiber tension profile bar comprises a plurality of profile steps, whereby said tension is applied at a plurality of levels during said rearward direction of travel of said blade carriage.

5. An apparatus as recited by claim 4, wherein said levels comprise a scribing level applied during said scribing and a fracture level applied subsequently, said scribing level being sufficient to hold said fiber taut during said scribing without substantially curling or rotating and said fracture level being sufficiently higher than said scribing level to cause fracture of said fiber after said scribing.

6. An apparatus as recited by claim 4, further comprising a servo motor adapted to open and close said pull clamp to receive and secure said free end of said fiber.

7. An apparatus as recited by claim 4, wherein said scribing force of said blade is adjustable.

8. An apparatus as recited by claim 4, wherein said scribing force ranges from about 1 to 5 grams.

9. An apparatus for cleaving an optical fiber waveguide, comprising:
   a) a support base;
   b) a fixed fiber support comprising a fixed fiber base including a guide track having an upper track and a lower track attached to said support base and a self aligning fiber holder adapted to hold said fiber at a supply end of said fiber, said holder being removably attached to said fixed fiber base;

c) a fiber pull tension assembly having a tension assembly base attached to said support base and a pull clamp rotatably attached to said tension assembly base, said pull clamp having a roller and being openable to receive said fiber and hold it at a free end of said fiber, d) a tension spring adjustably attached to said pull clamp and said fixed fiber base, said spring rotationally biasing said pull clamp to place said fiber in tension between said pull clamp and said self aligning fiber holder; and e) a scribing knife assembly comprising:
  (i) a motor drive assembly including a rotating crank;
  (ii) a linear slide and a blade carriage slidably mounted thereon for reciprocal motion traversing a forward direction and a rearward direction of travel, said blade carriage being driven by an actuator pivotally attached to said carriage and said crank, and said blade carriage comprising a fiber tension profile bar in engagement with said roller to control said tension;
  (iii) an upwardly biased blade arm attached to said carriage and having a scribing blade thereon; and
  (iv) a guide pin adapted to engage said guide track, said guide pin following said upper track during said rearward travel and said lower track during said forward travel, whereby said blade arm is biased to engage said fiber with said scribing blade with a scribing force and scribe said fiber during said rearward travel, said scribing force ranging from about 1 to 5 grams, and said blade arm is depressed to withdraw said scribing blade from engagement with said fiber during said forward travel; and further comprising a limit sensor adapted to determine the position of said blade carriage, said sensor being adapted to stop said motor drive assembly after completion of a reciprocating cycle of said blade carriage.

10. An apparatus as recited by claim 9, further comprising a servo motor adapted to open and close said pull clamp to receive and secure said free end of said fiber.

11. An apparatus as recited by claim 9, wherein said scribing force of said blade is adjustable.

12. An apparatus as recited by claim 9, wherein said scribing force ranges from about 1 to 5 grams.

* * * * *

UNITED STATES PATENT AND TRADEMARK OFFICE
CERTIFICATE OF CORRECTION

Figure 5:
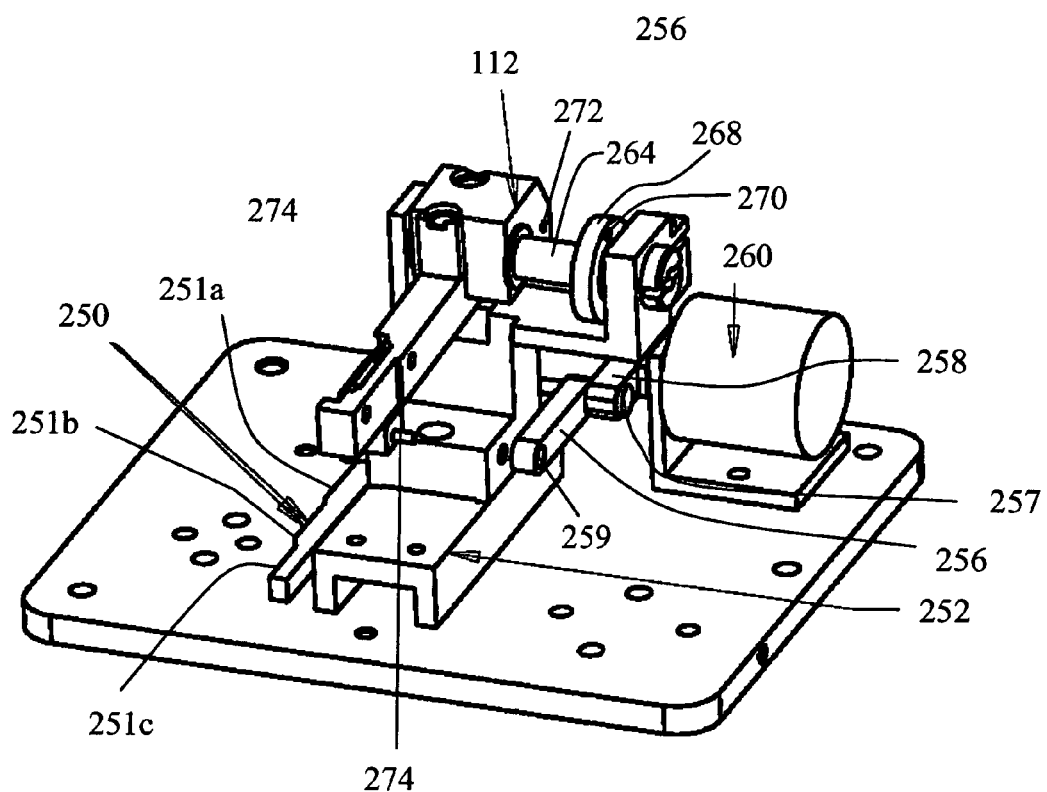
FIG. 5 is a perspective view depicting schematically a fiber pull tension assembly used in the fiber cleaving system shown in FIGS. 2–3.
Figure 5:
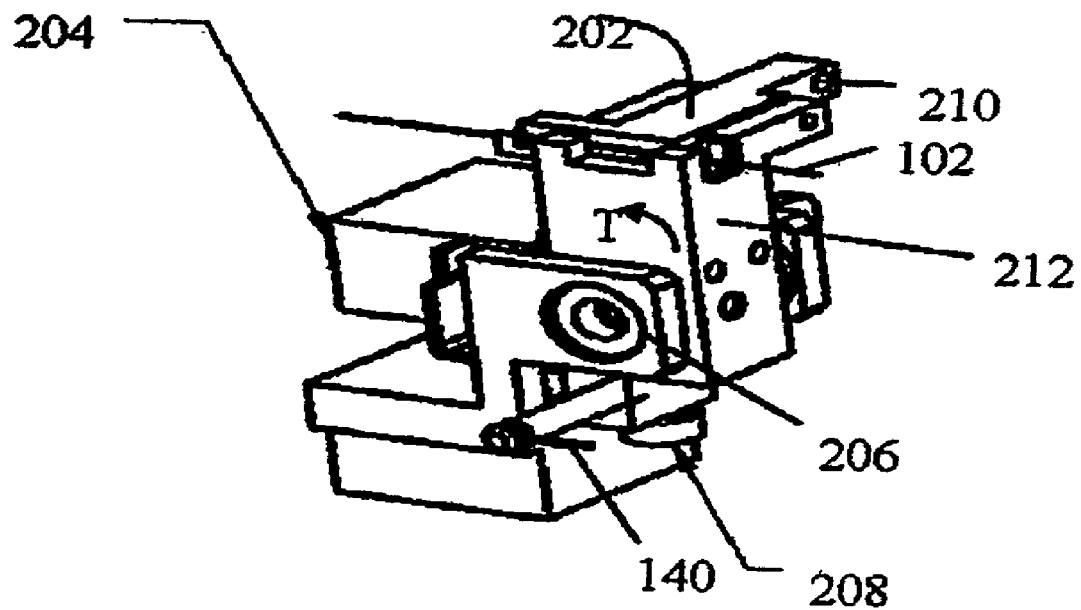

PATENT NO. : 7,090,414 B2  Page 1 of 2
APPLICATION NO. : 10/806537
DATED : August 15, 2006
INVENTOR(S) : Holam Chau It is certified that error appears in the above-identified patent and that said Letters Patent is hereby corrected as shown below:

In the drawings, Fig. 5 should be replaced with the following Replacement Sheet (see attached)

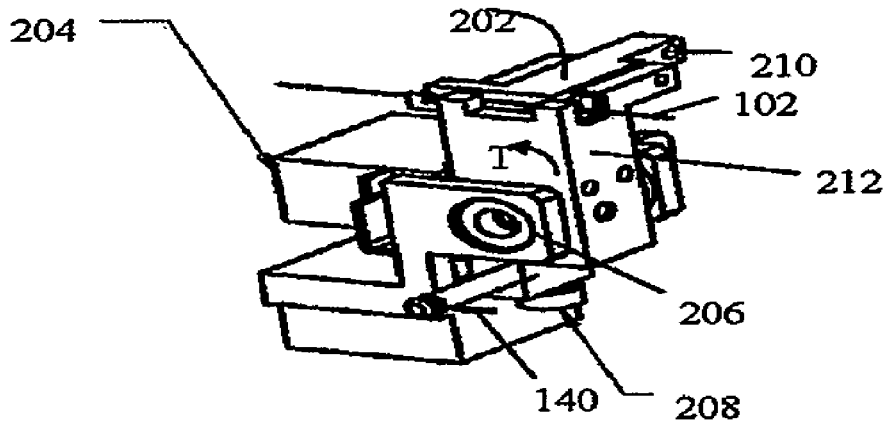

Signed and Sealed this

Tenth Day of April, 2007

JON W. DUDAS
*Director of the United States Patent and Trademark Office*